Feb. 3, 1959 — W. S. HASLEAU — 2,871,955
NON-CHOKING PLOW ROLLER
Filed March 1, 1955
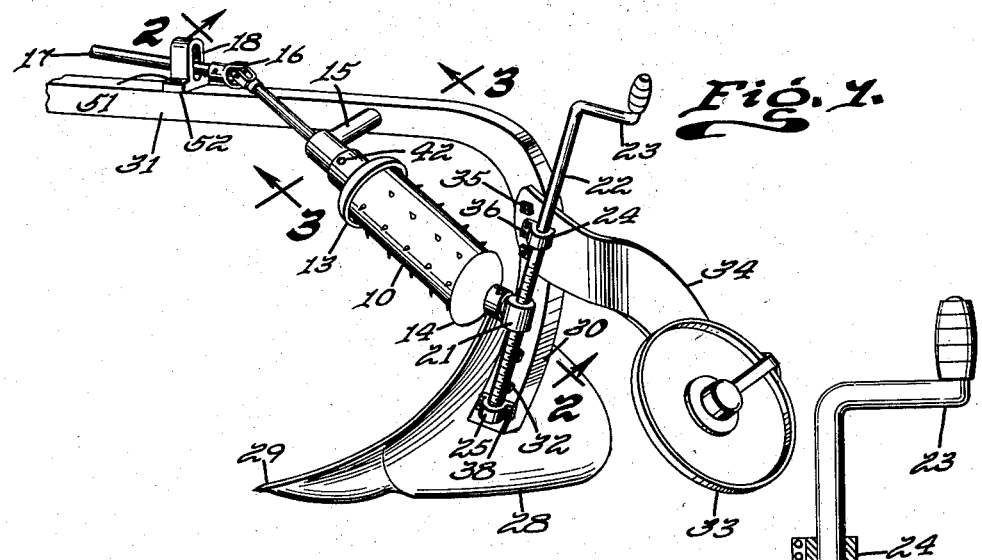
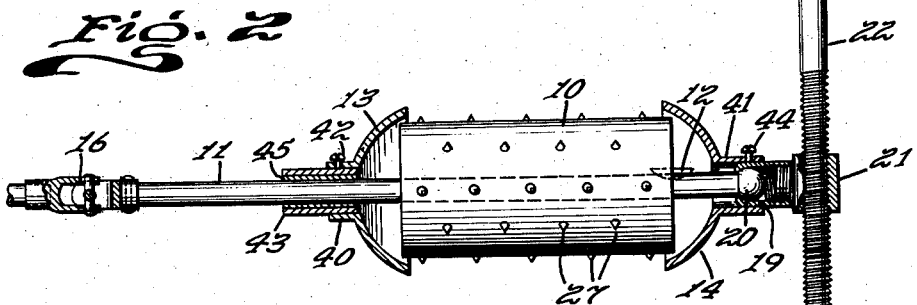
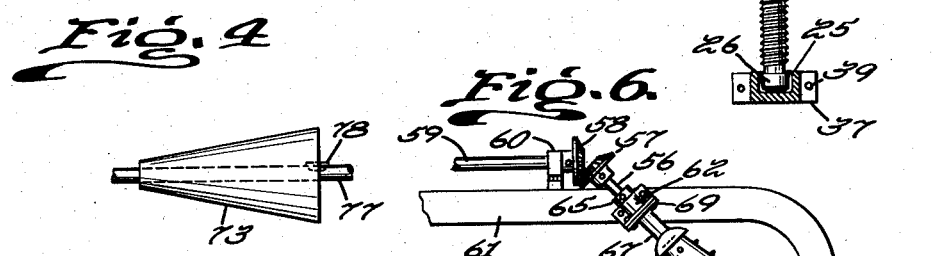
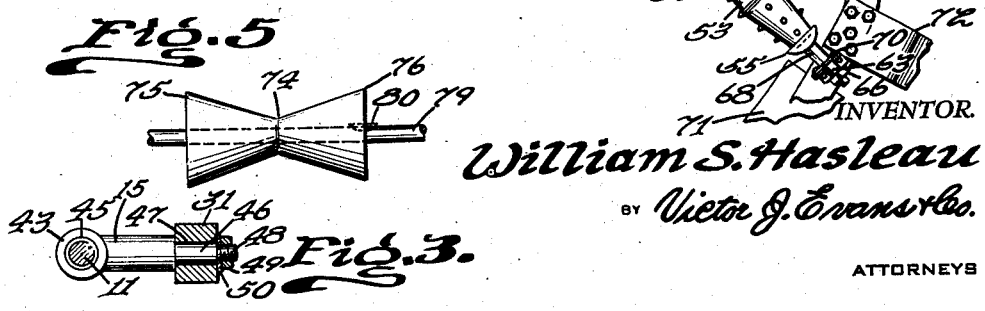
INVENTOR.
William S. Hasleau
BY Victor J. Evans & Co.
ATTORNEYS

United States Patent Office 2,871,955
Patented Feb. 3, 1959

2,871,955

NON-CHOKING PLOW ROLLER

William S. Hasleau, Montevideo, Minn.

Application March 1, 1955, Serial No. 491,331

1 Claim. (Cl. 172—63)

This invention relates to attachments for agricultural implements and particularly plows used in fields where grain is harvested with combines and where corn is harvested with mechanical corn pickers wherein the ground is covered with trash and stalks and, in particular, a power driven roller diagonally positioned across the bend of a plow beam whereby trash and stubble are thrown into a furrow and covered and wherein the possibility of the trash and stubble accumulating on the beam to clog or choke the plow is eliminated.

The purpose of this invention is to provide means for mounting a choke preventing roller across the bend of a plow beam to prevent choking and clogging and wherein the roller is adapted to be driven by the power take-off of a tractor operating the plow.

With modern agricultural implements, such as combines and corn pickers, the straw is distributed over the ground and the comparatively short corn stalks or stubble also remain upon or extend from the ground and, as the straw, stubble, and other trash accumulate above a plow share attempting to turn such products under, the products, which normally have fertilizing value, are burned and the fertilizing value lost. With this thought in mind, this invention contemplates a diagonally positioned roller mounted above a plow share and extended across the bend of the plow beam whereby with the roller rotated by the power take-off of a tractor drawing the plow the trash, straw, stubble and the like are thrown into a furrow and covered by the plow.

The object of this invention is, therefore, to provide means for mounting a roller on a plow whereby with the roller driven by power means for operating the plow the possibility of choking by straw, trash, stubble and the like is substantially eliminated.

Another object of the invention is to provide a non-choking roller adapted to be mounted on a plow to prevent choking and clogging of the plow in which the device is adapted to be attached to a plow without changing the beam, plow share or other parts thereof.

Another important object of the invention is to provide a non-choking roller for a plow and means for mounting the roller on the plow in which the position of the roller is readily adjustable.

A further object of the invention is to provide a non-choking roller for a plow in which the device is of a simple and economical construction.

With these and other objects and advantages in view, the invention embodies a shaft having knuckle or universal joints on the ends, a roller having teeth projecting from the peripheral surface, mounted on the shaft, substantially semi-circular guards at the ends of the roller positioned around the shaft and adapted to be fixedly attached to mounting elements, a bracket for pivotally attaching the shaft at one end of the roller to the horizontally disposed section of a plow beam and means for attaching the opposite end of the shaft to the plow beam at a point adjacent a plow share carried by the beam.

Other features and advantages of the invention will appear from the following description, taken in connection with the accompanying drawing, in which:

Figure 1 is a perspective view showing the non-choking roller mounted on a plow.

Figure 2 is a longitudinal section through the roller mounting taken on line 2—2 of Figure 1 with the parts shown on an enlarged scale.

Figure 3 is a section taken on line 3—3 of Figure 1 showing the bracket for attaching the shaft at the upper end of the roller to the plow beam.

Figure 4 is a view showing a modification wherein a tapered roller is used instead of the cylindrical roller shown in Figure 2.

Figure 5 is a view showing a further modification wherein the cylindrical roller is replaced with a roller of a reduced diameter at the center.

Figure 6 is a side elevational view showing the bend at the end of a plow beam with the non-choking roller rotatably mounted on the beam and illustrating a modification wherein the roller is driven from the power take-off of a towing vehicle with beveled gears instead of the universal joint shown in Figure 1.

Referring now to the drawing, wherein like reference characters denote corresponding parts, the non-choking or non-clogging roller of this invention includes, in the design shown in Figures 1 and 2, a roller 10 mounted on and keyed to a shaft 11 with a key 12 and having substantially semi-spherical guards 13 and 14 positioned at the ends and overlapping portions of the roller, a bracket 15 for supporting the shaft 11 at the upper end of the roller, a universal joint 16 connecting the upper end of the shaft 11 to the power take-off of a tractor through a shaft 17, a socket 18 through which the shaft 17 extends, a bearing 19 in which a ball 20 on the lower end of the shaft is positioned, an internally threaded sleeve 21 from which the bearing 19 extends and a threaded rod 22 having a hand crank 23 on one end and rotatably mounted in an intermediate bearing 24 and also in a bearing 25 in which a knob 26 on the lower end of the rod is rotatably mounted.

The roller 10 is provided with prongs or teeth 27 having sharp or pointed outer ends and with the roller positioned, as shown in Figure 1, the teeth are adapted to throw corn stalks, trash, and other stubble to one side of the plow share which is indicated by the numeral 28.

The plow share 28 is provided with a point 29 and the opposite end thereof is secured to a lower end 30 of a plow beam 31 with bolts 32. In the design shown the beam is provided with a supporting roller 33 that is rotatably mounted on a bracket 34 and the bracket is secured to the end 30 of the beam 31 with bolts 35.

The bearing 24 is secured to the end 30 of the beam 31 with bolts 36 that extend through the bracket 34 and the bearing 25, which is provided with flanges 37, is secured to the lower end of the portion 30 of the plow beam with bolts 38 that extend through openings 39 in the flanges 37.

The guards 13 and 14 extend from hubs 40 and 41 and, as illustrated in Figure 2, the hub 40 is secured by a set screw 42 to a sleeve 43 of the bracket 15 and the hub 41 is secured by a set screw 44 to the outer surface of the bearing 19.

The sleeve 43 of the bracket 15 is provided with a bearing bushing 45 and, as illustrated in Figure 3, the bracket 15 is provided with a stem 46 of reduced diameter, the stem being positioned in an opening 47 in the beam 31 and the extended end of the stem being provided with a threaded stud 48 on which a nut 49 and washer 50 are positioned.

The socket 18 is provided with an elongated opening to permit the shaft 17 to move vertically therein and the socket is secured to the plow beam 31 with bolts 51 that extend through flanges 52.

With the parts assembled and mounted, as illustrated in Figures 1 and 2, the lower end of the roller 10 is adapted to be moved upwardly and downwardly by turning the crank 23 whereby the shaft 11 pivots about the bracket 15 permitting the lower end of the roller to move downwardly to such a position that corn stalks, straw and other trash may be efficiently cleaned from the bend of the plow beam so that choking and clogging are prevented.

In the design illustrated in Figure 6, a roller 53 having tapering ends with guards 54 and 55, similar to the guards 13 and 14, is mounted on a shaft 56 having a beveled gear 57 at the upper end whereby with the gear 57 meshing with a similar gear 58 on a shaft 59, similar to the shaft 17, the roller is driven with beveled gears instead of the universal or knuckle joint 16. In this design the shaft 59 is totatably mounted in a bearing 60 on a plow beam 61, the upper part of the shaft 56 is rotatably mounted in a bearing 62 and the lower end of the shaft is rotatably mounted in a bearing 63 on an end portion 64 of the beam. The shaft 56 is provided with a set collar 65 that engages the upper end of the bearing 62 and a similar collar 66 that engages the lower end of the bearing 63. The guards 54 and 55 are stationary being secured by sleeves 67 and 68 to flanges 69 and 70, respectively, at ends of the bearings. In this design the beam 61 is attached to the upper end of a plow share 71 and the portion 64 of the beam is provided with a bracket 72, similar to the bracket 34 for supporting a roller, such as the roller 33.

As illustrated in Figure 4, a frusto-conical shaped roller 73 is illustrated and in Figure 5 a similar roller having a centrally disposed portion 74 of reduced diameter and end portions 75 and 76 is shown and it will be understood that these rollers, or rollers of other shapes and designs, may be used instead of the roller 10. The roller 73 is shown as being mounted on a shaft 77 and secured to the shaft with a key 78 and the roller shown in Figure 5 is mounted on a shaft 79 and keyed thereto with a key 80.

The shaft upon which the roller is mounted may be connected to a shaft extended from the power take-off of a tractor towing the plow with a universal joint, such as the joint 16 shown in Figure 1, or which may be referred to as a knuckle joint, or with beveled gears, as shown in Figure 6, or with other means for providing an adjustable connection or an angle between the axes of the shafts.

With the plow operating in fields having different products on the ground, it is necessary to adjust the angle of the roller to compensate for the products being turned over, the roller being adapted to operate more efficiently for straw when positioned at one angle and more efficiently for corn stalks and the like when positioned at a different angle.

It will be understood that other modifications, within the scope of the appended claim, may be made in the design and arrangement of the parts without departing from the spirit of the invention.

What is claimed is:

In a non-choking attachment for use on a plow, the combination which comprises a shaft having a knuckle joint at one end and a ball and socket mounting at the opposite end, a threaded sleeve extended from said ball and socket and positioned at a right angle thereto, a threaded rod extended through the threaded sleeve and having a crank on one end, bearings for rotatably mounting the rod on a downwardly extended end of a plow beam, a bracket adapted to be mounted on a plow beam from which the downwardly extended end extends and having a bearing in which the shaft is rotatably mounted on an extended end thereof, a roller having teeth projecting from the peripheral surface fixedly mounted on said shaft, stationary substantially semi-spherical guards positioned at the ends of the roller, a shaft extended from the knuckle joint at the upper end of the former shaft for connecting the shaft to a power take-off of a towing vehicle, and a socket adapted to be mounted on the plow beam upon which the bracket is mounted for providing a bearing for the shaft connecting the shaft upon which the roller is mounted to said power take-off.

References Cited in the file of this patent

UNITED STATES PATENTS

| 11,935 | Hibbs | Nov. 14, 1854 |
|---|---|---|
| 857,487 | Rivara | June 18, 1907 |
| 1,539,693 | Orr | May 26, 1925 |
| 1,846,323 | Elmore | Feb. 23, 1932 |